United States Patent [19]

Punater et al.

[11] Patent Number: 4,514,819

[45] Date of Patent: Apr. 30, 1985

[54] APPARATUS AND METHOD FOR MEASURING ROTATIONAL POSITION

[75] Inventors: Dinesh G. Punater, Dayton; Donald G. Bastian, Centerville, both of Ohio

[73] Assignee: Harris Graphics Corporation, Melbourne, Fla.

[21] Appl. No.: 385,209

[22] Filed: Jun. 4, 1982

[51] Int. Cl.[3] ........................ G06F 15/46; G06G 7/64; G06G 7/66

[52] U.S. Cl. .................................... 364/556; 364/471; 493/35

[58] Field of Search ............... 364/468, 469, 471, 472, 364/550, 556, 559, 560, 565, 518, 522; 377/15-18; 493/30, 35, 188; 226/9, 28, 32

[56] References Cited

U.S. PATENT DOCUMENTS

| | | | |
|---|---|---|---|
| 3,178,562 | 4/1965 | Acker et al. | 235/92 |
| 3,249,316 | 5/1966 | Loase | 242/75.44 |
| 3,592,133 | 7/1971 | Webendorfer | 101/228 |
| 3,896,377 | 7/1975 | Richardson | 324/161 |
| 3,912,252 | 10/1975 | Stephens | 270/79 |
| 3,963,902 | 6/1976 | Dowd | 235/92 |
| 4,264,957 | 4/1981 | Pautzke | 226/28 |

*Primary Examiner*—Raulfe B. Zache

*Assistant Examiner*—Dale M. Shaw

*Attorney, Agent, or Firm*—Biebel, French & Nauman

[57] ABSTRACT

An apparatus and method for measuring the relative circumferential setting of at least two rotating elements of a machine for operating on a moving web are provided wherein a first of the elements serves as a measurement reference. An electric reference pulse is generated for each revolution of the first element, along with a train of clock pulses wherein each count corresponds to an increment of rotation. A marker pulse is generated for each revolution of the second element, and the count pulses generated subsequent to generation of a reference pulse and up to and simultaneous with generation of the next succeeding marker pulse are counted, thereby providing a relative rotational measurement. The count is retained in a memory until the next succeeding count is completed. A mechanism for making circumferential adjustments to the second element is provided, along with generator for generating adjustment pulses for each increment of adjustment, a number corresponding to the number of adjustment pulses being added to or subtracted from the count retained within the memory. The retained number as updated is displayed in an appropriate manner.

14 Claims, 7 Drawing Figures

APPARATUS AND METHOD FOR MEASURING ROTATIONAL POSITION

BACKGROUND OF THE INVENTION

The present invention relates to an apparatus used in making adjustments in the circumferential setting of a rotating element of a machine for operating on a moving web. More particularly, the invention relates to an apparatus that measures the rotational position of one such rotating element with respect to the position of another element, and updates and displays the measurement as adjustments are made.

Conventional web presses used in the manufacture of business forms combine a plurality of sections or stations housing various machines for printing, numbering, perforating, slitting, punching holes or the like on a moving paper web. These operations are all performed by various machines, each typically including at least two rotating cylinders between which the web is passed during the manufacture of the forms. The particular relative locations of the features of each form that result from the different operations on the web are dependent upon both the lateral and circumferential setting of the cylinders of each machine. Thus, depending upon the needs of a particular job, it is necessary to adjust these settings prior to running of the press to ensure that each of the operations is performed in the proper location. Moreover, it may become necessary during the press run to adjust the settings of the cylinders of the various machines, to correct for any mismatching of the different operations.

Similar considerations apply to other multi-operation equipment containing machines for operating on a moving web. For instance, in a collator used for assembling a number of individual webs into a single multi-layer business form, various machines for layering, perforating, punching and the like of a multi-layer web are used. The cylinders of such machines require both initial and subsequent adjustments of their lateral and circumferential settings to ensure proper location of the various operations.

In equipment utilizing a series of rotating cylinders, various methods and devices are known for making adjustments to the circumferential setting of the cylinders, both while the cylinders are being rotated and while the cylinders are stopped. In order for the operator of the adjustment mechanism to properly make such adjustments, however, some means of measuring the circumferential setting of the cylinders with respect to each other must be provided.

In U.S. Pat. No. 3,963,902, issued June 15, 1976, to Dowd, a method and apparatus for providing such measurements is disclosed. A plurality of cylinders is used, each driven from a common drive train through individual differential devices, each device having an input connected to a reversible adjustment motor. An electric pulse generator is driven by the drive shaft, and supplies a plurality of signals in response to rotation of the drive train to a pulse counter. Each cylinder is provided with a pulse emitter for generating a single pulse in response to each revolution of the cylinder. One cylinder is designated as the reference cylinder, and the pulses from its emitter are supplied to the counter as start signals. A stop signal is also supplied to the counter, which is selected from the pulse emitter signals from any of the remaining cylinders. After rotation of the reference cylinder signals the counter to begin counting, the pulses supplied from the drive train generator are counted until the pulse emitter on the particular selected cylinder supplies a stop signal to the counter. The number of accumulated pulses is displayed by the counter, and represents the difference in rotational position between the reference cylinder and the particular cylinder under consideration. Upon receipt of the following start signal, the counter is cleared and the count is repeated.

It can be seen, however, that the apparatus disclosed in the Dowd patent requires that the press be operated at running speed to be effective. In the event adjustments are desired to be made while the press is being run at inching speed, it will be necessary to wait for the cylinders to complete one full revolution for the updated count reflecting the adjustment to be displayed. Accordingly, as the adjustment is being made, the operator has no indication of the size or effectiveness of the adjustment. Thus, it may often be necessary to repeat the adjustment process a number of times before the desired adjustment is made.

Further, it can be seen that the Dowd apparatus cannot be used for making circumferential adjustments with the press stopped. In the event such adjustments are desired, it will be necessary to start and run the press for at least one revolution of the cylinders following each actuation of the adjustment motor, again with the operator having no indication at the time of adjustment of the actual magnitude of the adjustment made.

What is needed, therefore, is an apparatus and method for measuring the circumferential setting of a rotating element of a machine for operating on a moving web. Such an apparatus and method should be usable regardless of whether the machine is being operated at running speed, inching speed, or is stopped. Such an apparatus and method should further provide a means for displaying the measurement, and should update the measurement and its display as circumferential adjustments are made.

SUMMARY OF THE INVENTION

The present invention provides an apparatus and method for measuring with respect to a first rotating element the circumferential setting of a second rotating element of a machine for operating on a moving web. The first and second elements are drivable by a common drive train at a common rotational speed, although the apparatus and method may be used regardless of whether the elements are in fact rotated at the time measurements are made.

A generator driven in synchronism with the first element is provided for generating an electrical signal that includes one reference pulse for each revolution of the first element with respect to a fixed point of the machine. A second electric signal is generated that includes a train of count pulses, one each of the count pulses being generated in response to rotation of the first element through a predetermined increment. A generator operatively connected to the second rotating element generates an electric signal that includes one marker pulse for each revolution of the second element with respect to a fixed point of the machine. The reference pulses, count pulses, and marker pulses are all received by a counter for counting the number of the count pulses received subsequent to receipt of one of the reference pulses and up to and simultaneous with receipt of the first succeeding one of the marker pulses.

A memory retains the number of the counted clock pulses until receipt by the counter of the second succeeding one of the marker pulses.

The circumferential setting of the second rotating element may be selectively adjusted with respect to the first rotating element, whereupon a generator operatively connected to the adjustment means generates an electric signal including adjustment pulses. One each of the adjustment pulses is generated in response to adjustment of the second element through the increment of rotation corresponding to one of the count pulses. The counting means is adapted to receive the adjustment pulses, and to modify the number of count pulses retained within the memory by the number of the adjustment pulses received subsequent to receipt of the first marker pulse and up to and simultaneous with receipt of the second marker pulse. The count retained within the memory may be selectively displayed.

The means for generating the reference pulse and the count pulses may be an optical incremental encoder. The means for generating the marker pulse includes two parts, a Hall effect switch and a metallic sensor to which the switch is responsive. One of the two parts is mounted so as to be rotatable in synchronism with the second rotatable element, and the other part is mounted so as to be stationary with respect to the second element. The parts cooperate once per revolution of the second element for generation of the marker pulse.

The selective circumferential adjustment of the second element may include a differential device having a first input from the drive train, an output drivingly connected to the second element, and a second input. A motor is connected to the second input for introducing rotational displacement between the drive train and the second input. The motor may be a stepper motor, and the adjustment pulse generator generates the adjustment pulses in response to incremental actuation of the stepper motor.

Alternatively, the means for generating the adjustment pulses may include a shaft angle position encoder, the shaft of the encoder being rotated in response to adjustment of the circumferential setting of the second element. The shaft may be coupled directly to the second element for generation of the adjustment pulses during circumferential adjustment of the elements when rotation of the element by the drive train is stopped, or the second element may include a portion that moves linearly as the adjustment is made, the encoder shaft being operatively connected to the linearly moving portion by a linkage.

The adjustment pulse generator may include a means for generating a second electric signal for indicating the direction of adjustments made to the circumferential setting of the second rotating element. The counter is further adapted to receive the second signal, and for modifying the retained number of count pulses in a numerical direction corresponding to the rotational direction indicated by the second signal.

Accordingly, it is an object of the present invention to provide an apparatus and method for measuring the circumferential position of a rotating element with respect to another rotating element driven by a drive train at a common rotational speed; to provide such an apparatus and method that may be used reqardless of whether the rotating elements are being rotated at running speed, inching speed, or are stopped; to provide such an apparatus and method that provides for display of the measurement made; and to provide such an apparatus and method that updates the measurement display as adjustments are made.

Other objects and advantages will be apparent from the following description, the accompanying drawings and the appended claims.

DETAILED DESCRIPTION OF THE PREFERRED EMBODIMENT

In the preferred embodiment, as shown generally by the drawings, the present invention is described for use within a web press used in the manufacture of business forms. It will be recognized, however, that the present invention is equally suited for use in other equipment used in manufacturing business forms, for example collators, or for use in presses designed for manufacturing products other than forms. The present invention may be applied to any device in which machines having rotating elements are used to operate on moving webs.

Figure 1:
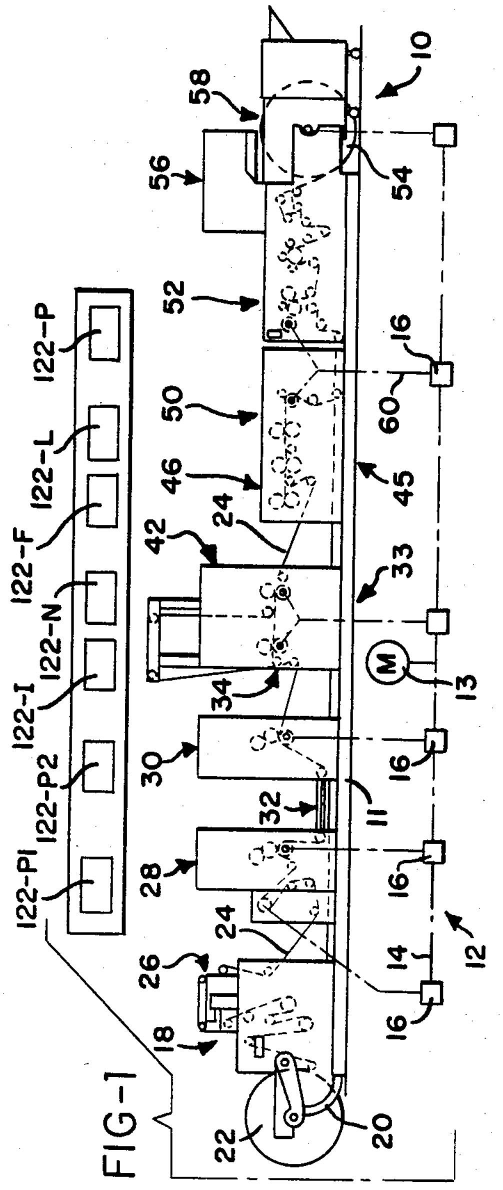
FIG. 1 is an overall view of a typical web press for printing business forms.

Referring now to FIG. 1, the forms press 10 comprises a base 11 supporting, in longitudinal alignment, a number of stations at which various operations are formed on a web of paper or like material in order to print, mark, and perforate the web repeatedly. Such machines are per se well know, and details of them are shown, for example, in U.S. Pat. Nos. 3,249,316; 3,250,528; 3,369,436; 3,398,618; 3,592,133; 3,883,131; and 3,938,437. The drive train 12, including the motor 13, line shaft 14, gear boxes 16, and the like, is shown schematically, it being understood that such drive is mechanically conventional and is arranged in order to operate the rotating and other moving parts at the various stations of the machine in exact synchronism, such that operations formed at any station are in register with operations performed at other stations.

The unwind station 18 includes a support 20 for the roll 22 from which the web 24 is pulled. Exiting the unwind station 19, the web 24 passes over an adjustable web guide device 26, which establishes the lateral position of the web. A typical device of this kind is explained, for example, in U.S. Pat. No. 3,249,316.

After the unwind station 18, understanding that the web 24 is unwound and progresses from left to right as viewed in FIG. 1, the press 10 includes first and second print stations 28 and 30 which include conventional printing cylinders and the like for printing repetitively on the web 24 by means of offset, letterpress, flexographic, or gravure printing, as may be desired. It is understood that although two print stations 28 and 30 are shown, there may be from one to as many as four or more print stations, which can print in different colors as well as different images. In the embodiment shown, offset printing equipment is generally illustrated since it is most often used, and two print stations 28 and 30 are shown with turning bars 32 therebetween. The web can optionally be threaded around the turning bars 32 in order to reverse the surface of the web 24 presented to the second print station 30, such an arrangement sometimes being referred to as backprinting.

Following the second print station 30 the web 24 passes to the numbering section 33 including a first numbering station 34 which is optionally used for performing an operation known in the business forms printing art as "imprinting". In general, a repetitive printing operation is performed on the web at station 30 by one or more flexible letterpress-type plates, sometimes referred to as "patches", which are secured to the surface of a narrow supporting cylinder 32 in predetermined registered locations. The printing operation is generally similar to letterpress printing, with ink appropriately being applied to the raised image areas of the imprint patches.

Following the first numbering or imprint station 34, the web 24 passes to a second numbering station 42 where one or more numbering machines are mounted to print different number combinations on the web 24. The numbering machines are per se known, and function generally to change the number printed on successive portions of the web 24, either in straight numerical progression, reverse progression, or in some progression where certain numbers are skipped, depending upon the size and complexity of the particular job, and the number of these machines being used.

Figure 3:
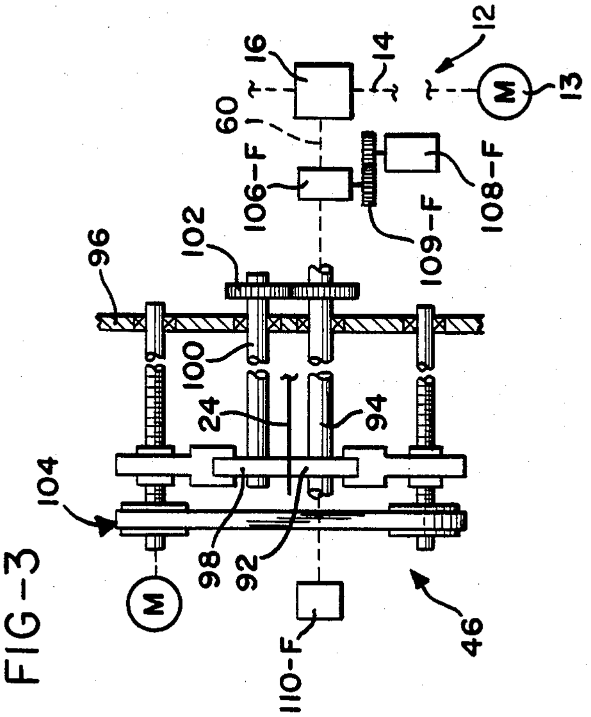
FIG. 3 is a diagrammatic view of the file hole punch station of the press showing its circumferential adjustment devices.

After numbering, the web 24 passes to the processing section 45 of the press 10, first to a file punch station 46, where one or more rotary punch and die mechanisms may operate on the web 24, as shown in FIG. 3, to form so-called file holes in areas of the web. These holes are sometimes provided in business forms as a convenience to the user, being intended to receive posts, brads, or other retainers to hold the separated sheet or form in a file. The holes may be located at any convenient point within the area of the form, depending upon the needs of the customer and his filing equipment.

Figure 2:
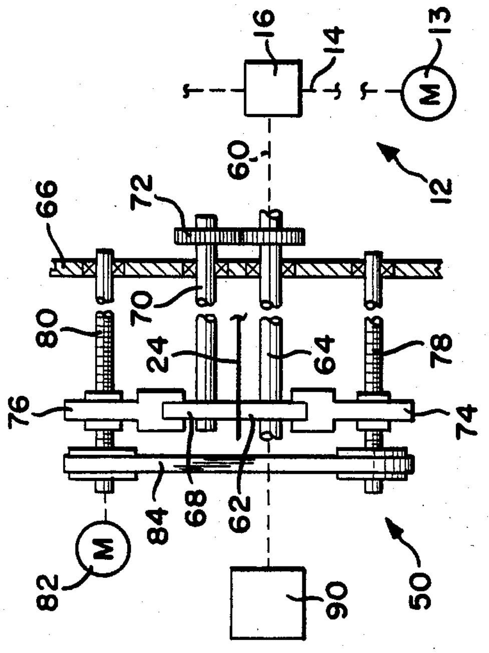
FIG. 2 is a diagrammatic view of the line hole punch station of the press showing the pulse generation devices.

After the file punch station 46, the web 24 is threaded through a line hole punch station 50, seen in FIG. 2, wherein appropriate rotary punches and dies can form line holes, usually in marginal regions of the forms. These holes are needed particularly in multi-part forms made up of several webs, wherein webs prepared in this or similar machines are subsequently combined with similar webs in a collating machine, as described hereafter.

Following the line hole station 50 there is a perforating station 52, which may incorporate several different types of perforators and/or slitter devices for forming partial lines of severance either crosswise or lengthwise of the web, as needed. The first part of the perforating station 52 usually incorporates a cylinder containing the first or main cross perforator blades which form lines that also separate successive forms. This is followed by small slitter wheels arranged to contact the web intermittently, these usually being known as skip perforators, then followed by a second cross perforator cylinder which may be used to make internal or partial cross perforations, and subsequently followed by one or more vertical perforators which perform lengthwise discontinuous slits or cuts in the web, and then followed by slitter wheels which make continuous lengthwise slits in the web.

At this station operations on the web 24 are essentially complete except for determining the form in which the web 24 is taken from the press 10. If the finished web 24 is part of a multipart form, then it will be rewound onto a take-up roll 54, and can be carried away on any convenient device to the collating machine, where the web is unrolled from the roll 54. On the other hand, if the particular job is concerned with a single layer form, or with some other printed product such as consecutively numbered tickets, cards, or the like, the web 24 may optionally be supplied to a zig-zag folder which comprises the folding cylinders 56 and delivery table 58. Details of typical folders are disclosed in U.S. Pat. Nos. 3,250,528 and 3,912,252. It is also possible to sever the web 24 into individual sheets at this station, as is well known in the art.

From the foregoing, it will be appreciated that a number of the operations at the different stations broadly described are optional, depending on the particular needs of the job; thus, the press 10 may be used in many different combinations, with some stations operative, and others not functioning, depending upon the types of printing required and the types and locations of punched holes and various perforations and slits in the particular job requirement. Additionally, the job may require the printing, numbering or processing to be performed in relative locations on the web different from previous jobs. A typical press is capable of multicolor printing, printing on both sides of the web, printing numbers in desired progression and location on each image area of the web, along with the necessary punched holes and/or perforations, all in registration with the web opearting at speeds up to on the order of 1200 feet per minute.

Consequently, it is necessary to be able to initially positon, monitor, and possibly subsequently adjust the circumferential or rotational setting of the various machines within the various stations. While such adjustments may be performed by a trial-and-error method, of course, it would be much more efficient to measure and display the circumferential positioning of the machines as adjustments are made. Such measurements may be made by designating one of the machines as a reference, and by expressing the measurement as an angular phase difference between the remaining machines and the reference. In the present invention, the machines of the line hole punch station 50 are selected as the reference, although it will be recognized that any of the machines of web press 10 may be so selected.

As shown in FIG. 1, the main drive motor 13 rotates the line shaft 14 which is connected through the various gear boxes 16 to the different sections of the press 10. Within the processing section 45, there are direct connections, via secondary drive shaft 60 and associated gears (not shown), between the first cross perforating cylinder of station 52 and the drive train 12, and between the line hole punch station 50 and the drive train 12. This establishes the zero rotational or circumferential position of the entire press 10, and circumferential adjustments are made using these as a reference or zero position. Line hole punch station 50, shown in detail in FIG. 2, includes a machine having pairs of narrow, rotatable cylinders, of which one pair is shown. Line hole die cylinder 62 is mounted to a shaft 64, which in turn is journaled for rotation within the side frames 66 (only one shown) of the station 50. Shaft 64 is driven by connection to secondary drive shaft 60, which in turn is driven by drive train 12. Line hole punch cylinder 68 is also provided, for cooperation with die cylinder 62, and is mounted to shaft 70 which is similarly journaled within side frames 66. Shaft 70 is also driven by drive train 12, from shaft 64 through gears 72, and the web 24 is passed between cylinders 62 and 68.

In addition to circumferential adjustment of the machines of press 10, it is often necessary for a particular job to also adjust the lateral position of the machines. Thus, in line hole punch section 50, both die cylinder 62 and punch cylinder 68 are provided with yoke-like retainers 74 and 76, respectively, for both retaining cylinders 62 and 68 in position and moving them laterally along shafts 64 and 70, respectively. Retainers 74 and 76 are each mounted on screw shafts 78 and 80, respectively, which are journaled within side frames 66. For adjustment of lateral position of cylinders 62 and 68, screw shaft 80 may be driven by a reversible motor 82, thereby moving retainer 76. Rotation of shaft 80 in turn also drives screw shaft 78, connected to shaft 80 by a linkage, shown here as belt 84, for similar movement of retainer 74.

As part of the circumferential measurement system of the present invention, a master encoder 90, preferably an optical incremental encoder with a marker pulse channel, is driven from the shaft 64 carrying the line hole die cylinder 62 of station 50. Master encoder 90 provides as its output a pair of electric signals, one including a train of count pulses generated as a function of the rotation of die shaft 64. Each count pulse generated by encoder 90 corresponds to an increment of rotation of shaft 64, and hence, of rotation of drive 12, and ultimately, of rotation of the cylinders of each of the machines of the press 10. Encoder 90 is preferably selected to generate 2000 count pulses per revolution for a cylinder of 22-inch circumference, although it will be recognized that other count pulse frequencies may be used, depending upon the desired precision of the measurement.

The second signal generated by encoder 90 provides a single pulse for each revolution of shaft 64 at a fixed point along the rotation thereof. These pulses are used as reference trigger pulses, to define a rotational position of shaft 64 for use as a reference point against which the rotational positions of the other machines maybe measured.

Each of the machines to be circumferentially adjusted within the numbering section 33 and the processing section 45 includes essentially identical apparatus for the making of the circumferential measurement. By way of example, file hole punch station 46 will be considered, shown in detail in FIG. 3. It will be noted that the machine of station 46 is quite similar to that of the line hole punch station 50, and includes a narrow rotatable file hole die cylinder 92 mounted to a shaft 94, journaled for rotation within the side frames 96 (only one shown). A cooperating file hole punch cylinder 98 is mounted to shaft 100, similarly journaled within side frames 96. Shaft 100 is rotated by rotation of shaft 94 through a pair of gears 102. Both cylinders 92 and 98 are provided with apparatus 104 for making lateral positional adjustments of cylinders 92 and 98 along shafts 94 and 100, respectively, that is similar in construction and operation to the lateral adjustment apparatus used with line hole punch station 50. Web 24 is passed through file hole punch station 46 between cylinders 92 and 98.

The drive for the file hole die and punch shafts 94 and 100 is derived, mechanically, from the drive train 12 through secondary drive shaft 60. The drive shaft 60 is coupled to shaft 94 through a conventional high ratio differential 106-F, preferably of the harmonic drive type, which has a secondary input connected to a stepper motor 108-F through change gears 109-F to achieve very small differences in phase adjustment between the primary input from drive train 12 and the output to shaft 94. Thus, it will be recognized that the differential 106-F and the stepper motor 108-F constitute the means by which the circumferential adjustment of the file hole punch station 46 with respect to the line hole punch station 50 is made.

The output from differential 106-F drives the file hole die shaft 94, which in turn is connected to a once-per-revolution sensor 110-F, which may be for example a Hall effect switch. Thus, the switch produces a single marker trigger pulse for each revolution of the shaft 94, and it can be seen that if the shaft 94 is located at the zero position with respect to line hole punch station 50, the marker pulse from sensor 110-F will correspond to the reference pulse generated by master encoder 90.

This same arrangement for making adjustments of circumferential setting applies to each of the stations of the numbering section 33 and the processing section 45 in which adjustment is to be made. Each of these stations will include a harmonic differential and a stepper motor, such as those designated 106-F and 108-F in FIG. 3, as well as other similar parts. In order to make clear that certain parts are repeated in each section, the suffix F has been added to certain of the reference numerals used in the drawings. Accordingly, for instance, while the file hole punch station 46 includes a harmonic differential 106-F, the imprinting station 34 will also include a similar harmonic differential, designated as 106-I.

Figure 4:
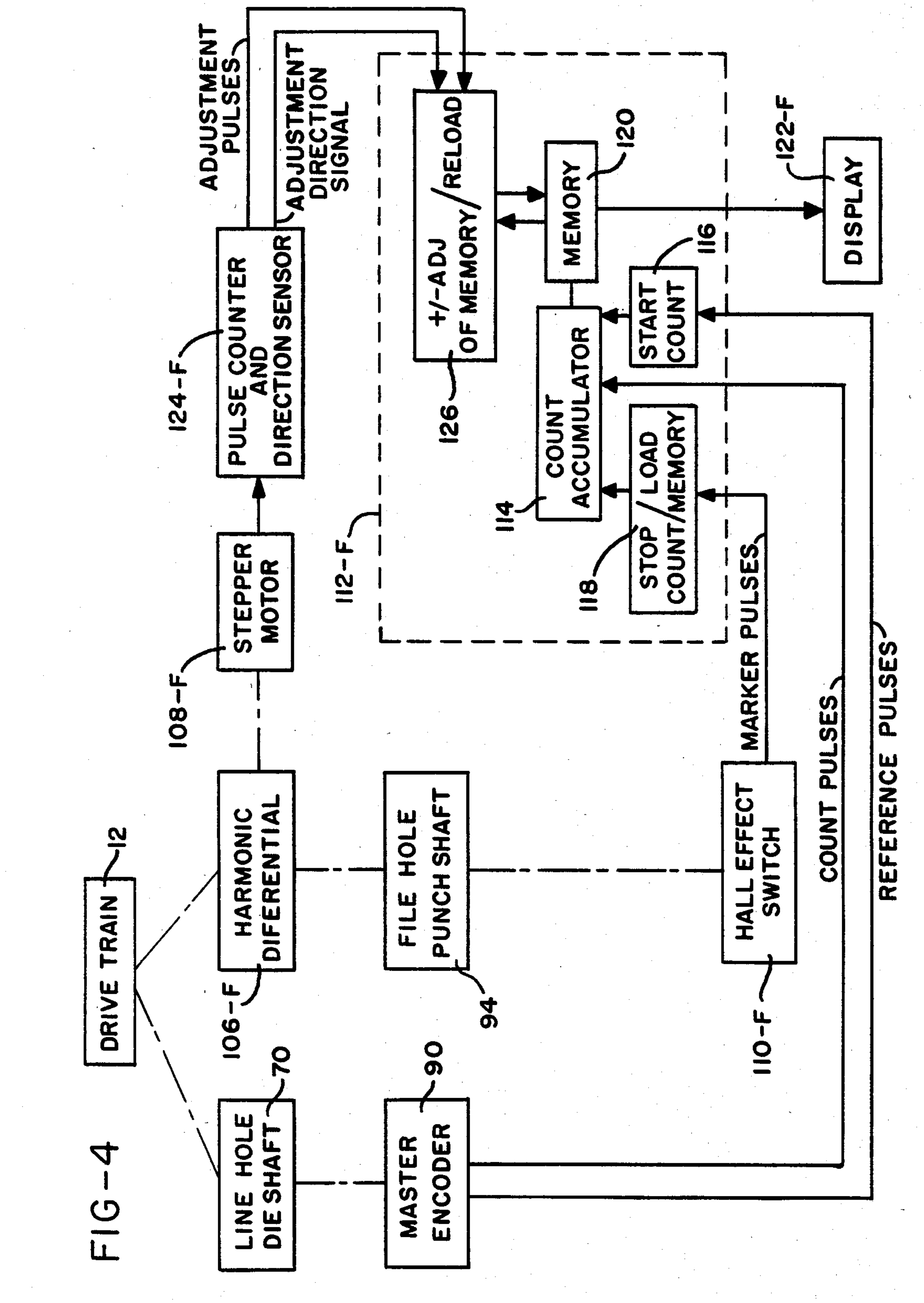
FIG. 4 is a schematic view showing the operation of the adjustment and measurement devices of the file hole punch station.
Figure 6A:
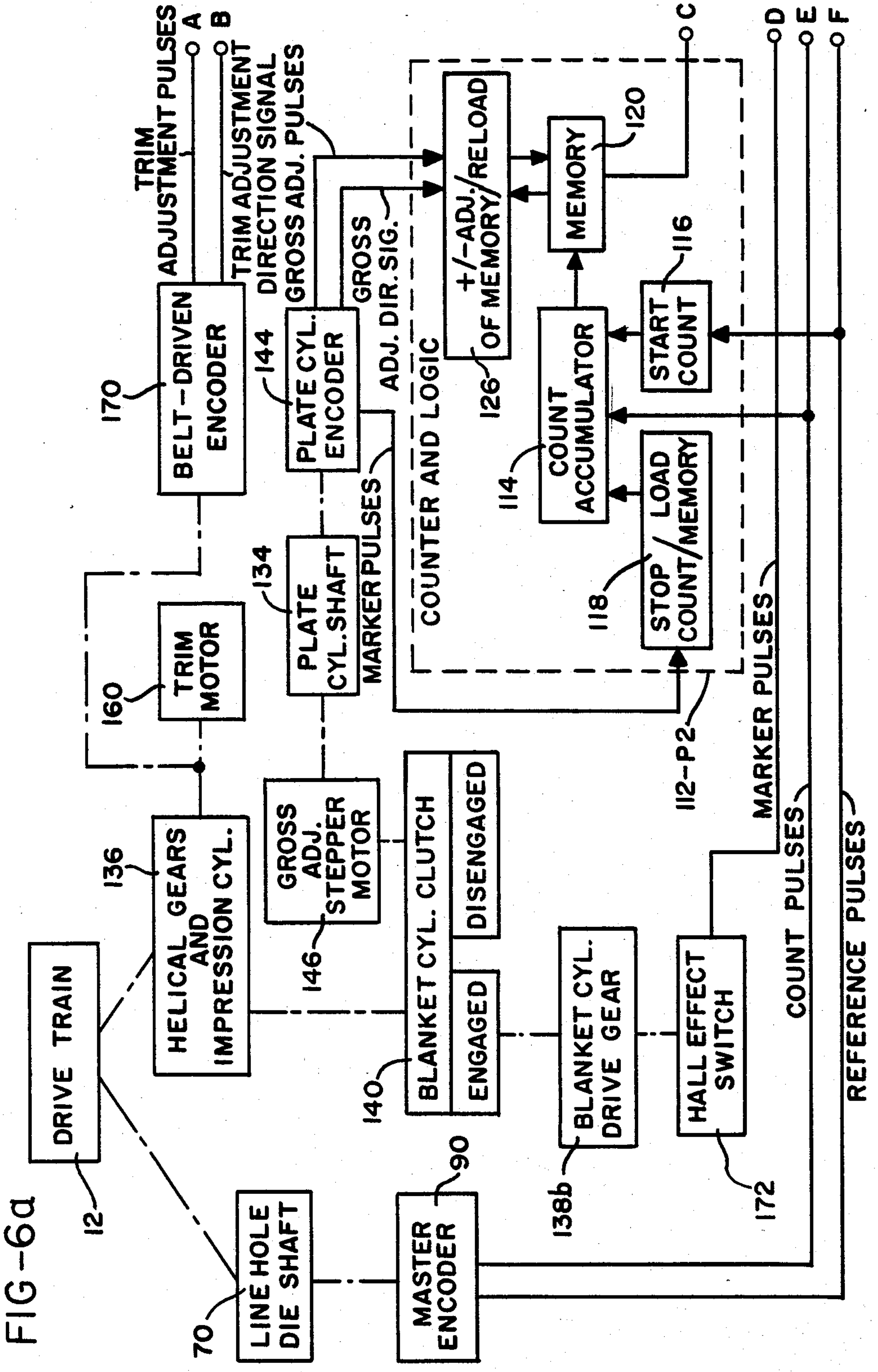
Figure 6B:
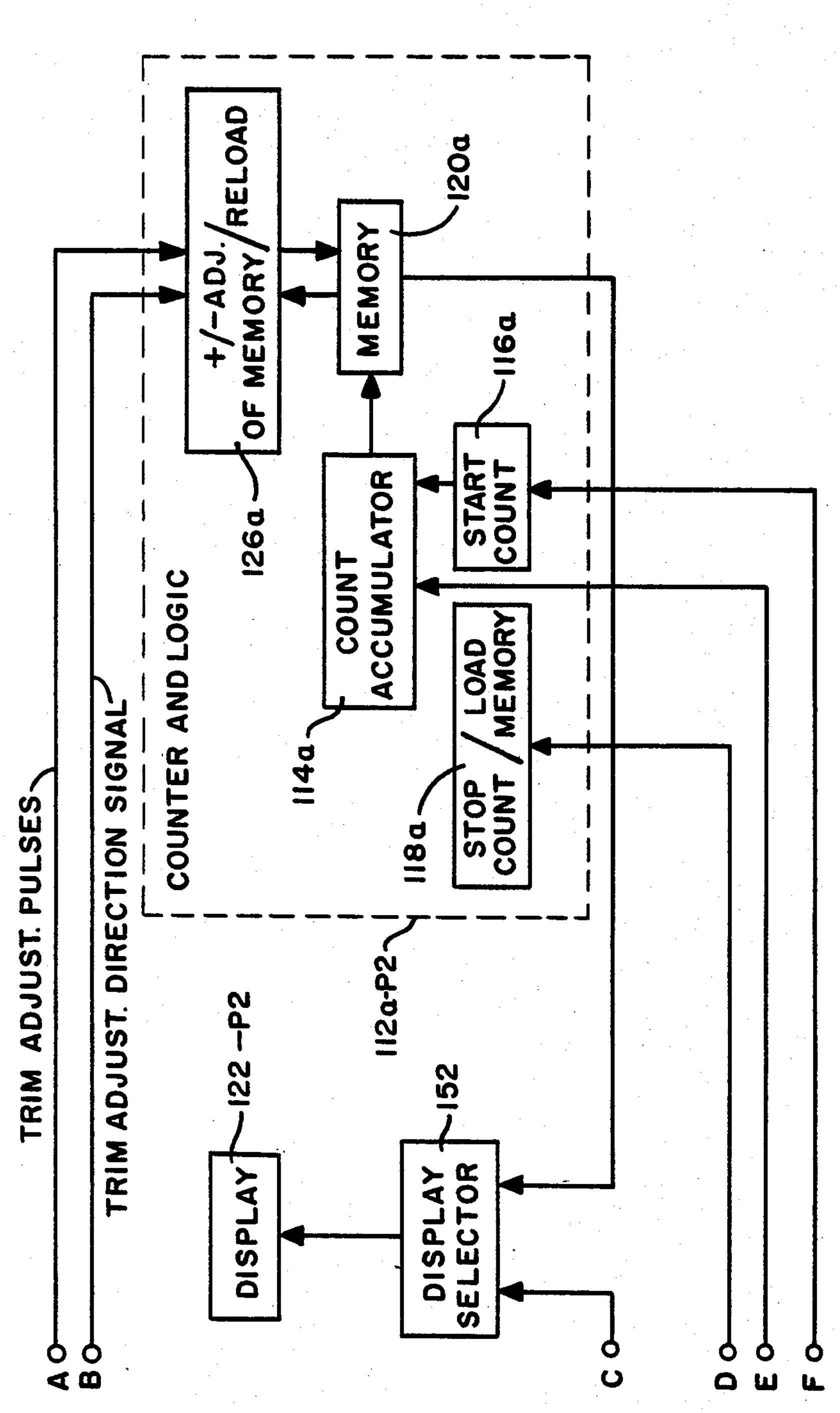

The processing of the signals generated for measurement of the circumferential setting of the machines of the press 10, again using the file hole punch station 46 as an example, may be seen schematically in FIG. 4. Master encoder 90, in response to being driven by line hole die shaft 70 and drive train 12, generates count pulses and reference pulses, both of which are supplied to counter and logic 112-F. The marker pulses generated by the Hall effect switch 110-F, driven by the file hole die shaft 94 from harmonic differential 106-F, are similarly supplied to counter 112-F.

Counter 112-F includes count accumulator 114, to which the count pulses from master encoder 90 are supplied. The reference pulses from master encoder 90 are directed to a "start count" signal generator 116, which upon receipt of a reference pulse operates to clear accumulator 114 of any counts therein and to cause the accumulator 114 to begin to count those count pulses received subsequent to receipt of the reference pulse. Accumulator 114 continues to count the received count pulses, until an appropriate signal, generated by "stop count/load memory" signal generator 118 is provided in response to receipt by generator 118 of a marker pulse from Hall effect switch 110-F. In addition, upon receipt by generator 118 of the marker pulse, a signal is provided to accumulator 114 causing the completed count to be loaded into a memory 120, thereby erasing from memory 120 any number previously stored therein. An appropriate display 122-F is connected to counter 112-F, for displaying digitally, or in any other suitable fashion, the number currently retained within memory 120.

Thus, for each revolution of the drive train 12, the accumulator 114 of counter 112-F is reset by the reference pulse from master encoder 90, and count pulses are counted until a marker pulse from the Hall effect switch 110-F stops the count. The display 122-F shows as a digital value the results of the count, stored in memory 120, which is refreshed each revolution of the drive train 12 as each marker pulse is received by counter 112-F. Adjustments made to the circumferential setting of the file hole punch shaft 94 will be included within the number shown by display 122-F, since the count is updated upon each revolution of the drive train 12. Ihus, so long as the press 10 is being operated at running speed, the number displayed represents the actual adjusted position of the tile hole punch shaft 94 with respect to the zero or reference position.

It should be recognized that the use of the reference and marker pulses for starting and stopping the operation of the accumulator 114 may be reversed without affecting the basic principles of the present invention. The counter 112-F may be adapted such that the accumulator 114 begins counting in response to receipt of one of the marker pulses, and stops upon receipt of the following reference pulse. Adjustment pulses modify the count which is retained within memory 120 between successive reference pulses. Of course, in such a case, the number of totaled counts represents a circumferential difference between the measured machine and the reference machine taken in the opposite rotational direction from the preferred embodiment, but such an arrangement is entirely practical.

It should be further recognized that the apparatus as described thus far is adequate to display measurements of circumferential setting that will be updated as adjustments to such settings are made. What should also be readily apparent, however, is that such apparatus will be effective only so long as the press 10 is being operated at its running speed. In the event press 10 is run only at inching speed, file hole punch shaft 94 must complete one full revolution before a marker pulse will be produced by Hall effect switch 110-F, thereby updating the measurement shown on display 122-F. Thus, at the time stepper motor 108-F is energized, the operator has no indication of the effect of the adjustment, and thus may easily adjust the circumferential setting by too much or too little. Moreover, in the event press 10 is stopped, no marker pulses will be produced, and the display 122-F will not be updated until the press 10 is restarted.

To avoid this limitation, a pulse counter and direction sensor 124-F is connected to stepper motor 108-F to be responsive to the pulses provided for actuation of motor 108-F. Pulse counter 124-F generates a signal that includes adjustment pulses, with an integer number of pulses corresponding to adjustment of the circumferential setting of shaft 94 by motor 108-F through a rotational increment corresponding to that represented by a single one of the count pulses generated by master encoder 90. Preferably, each adjustment pulse will represent one-tenth of a count pulse, and stepper motor 108-F, the differential ratio of differential 106-F, and change gears 109-F will all have been selected so that each step represents such an adjustment. In which case pulse counter 124-F will use the actuation pulses supplied to motor 108-F directly for the adjustment pulses, with perhaps only slight modification so that the pulses will be compatible with the logic of counter 112-F. Pulse counter 124-F further includes a direction sensor, for determination of the direction in which the circumferential adjustment by stepper motor 108-F has been made. The direction may be sensed, for instance, simply by determining the polarity of the actuation pulses supplied to motor 108-F, and an appropriate adjustment direction signal is provided as an output of pulse counter 124-F.

The adjustment pulses and the adjustment direction signal are supplied to memory adjustor 126 of counter 112-F. Memory adjustor 126 first divides the number of adjustment pulses received by ten, and then modifies the number retained within memory 120, by both the appropriate quantity and in the appropriate direction as indicated by pulse counter 124-F. The modified number is then reloaded into memory 120, and appears as an adjustment to the number shown on display 122-F.

While pulse counter 124-F and memory adjustor 126 are redundant when the press 10 is being operated at running speed, it can be seen that in the event press 10 is inched or stopped, actuation of stepper motor 108-F will increment or decrement the memory 120 so that the display 122-F will be updated to the anticipated new setting of the file hole die shaft 94.

Figure 5:
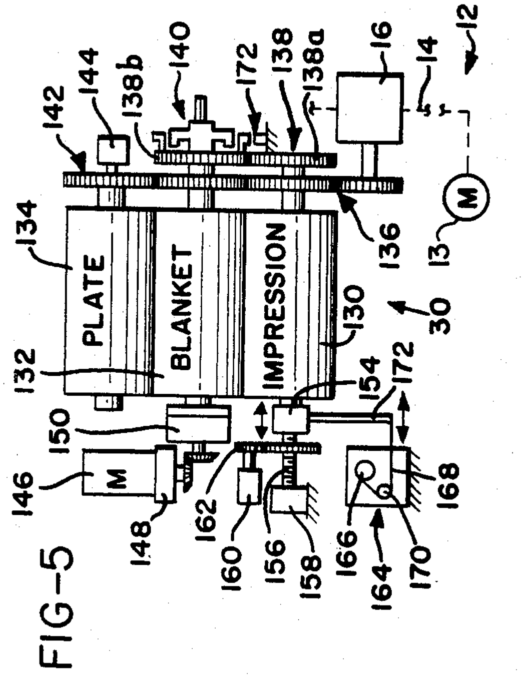
FIG. 5 is a diagrammatic view of one of the print stations of the press showing its circumferential adjustment devices; and FIGS. *6a* and *6b* together comprise a schematic view showing the operation of the adjustment and measurement devices of the print station of FIG. 5.

The circumferential measurement apparatus used with the second print station 30 of the press is shown in FIG. 5, it being understood that construction and arrangement of the machines and measurement apparatus for the first print station 28, and any other print stations that may be used as a part of the press 10, are identical. Print station 30 is shown diagrammatically as a lithographic offset unit, from which the inking and dampening mechanisms, and the impression on-off controls are omitted for clarity. A cooperating impression cylinder 130, blanket cylinder 132, and plate cylinder 134 are appropriately journaled for rotation within the side frames (not shown) of print station 30. The impression cylinder 130 is driven directly from a gear box 16 by a set of helical gears 136, and cylinder 134 is further mounted, in addition to providing for rotation thereof, for limited lateral movement along the cylinder axis in conventional fashion.

The shaft of impression cylinder 130 in turn carries one gear 138*a* of a helical gear set 138, the other gear 138*b* of this set being rotatably mounted on the shaft of the blanket cylinder 132, selectively coupled to the cylinder 132 by a clutch 140. The plate cylinder 134 is counter-rotated by the blanket cylinder 132 by a gear set 142, and plate cylinder 134 is also journaled within the station side frames for limited movement along the plate cylinder axis.

While press 10 is being operated at running speed, and so long as the circumferential setting of the print station 30 need not be adjusted, the setting of station 30 with respect to the rotational reference, i.e., line hole punch station 50, may be measured in the same manner as the stations of the numbering section 33 or the processing section 45. A two-channel rotary incremental encoder 144 is coupled to the shaft of the plate cylinder 134, encoder 144-P2 being additionally adapted to generate a once-per-revolution marker pulse. The marker pulses produced by encoder 144 are directed to a counter 112-P2 that, as the reference numeral suggests, is identical in construction and operation with the counters 112 used in the nonprint stations. The marker pulses correspond to those generated by the Hall effect switches 110 in the nonprint stations, and cooperate with the count pulses and reference pulses supplied to counter 112-P2 from the master encoder 90, to provide a digital measurement of the circumferential setting of the print station 30 in the same manner as that described above for file hole punch station 46. A schematic diagram showing processing of these signals may be seen in FIGS. *6a* and *6b*.

The apparatus for making circumferential adjustments to print station 30, however, as well as to other print stations of the press 10, is different in construction and operation from the adjustment means provided for the stations of numbering section 33 and processing section 45. Because print station 30 is driven directly from drive train 12, rather than through a harmonic differential, gross adjustment of circumferential setting of the print station 30 may be made only when the press 10 is stopped. As shown in FIG. 5, a stepping motor 146 is connected through a gear reduction unit 148 and an electric clutch 150 to the blanket cylinder 132 at the end of the cylinder 132 opposite clutch 140. With clutch 140 open, clutch 150 engaged, and the print station 30 off impression, the stepping motor 146 can change the circumferential adjustment of the blanket cylinder 132 and plate cylinder 134 with respect to the drive train 12 through a full 360°.

In order to update the measurement of the circumferential setting of the print station 30, the two-channel output of encoder 144 is used. Encoder 144 provides as one channel an output signal consisting of a train of gross adjustment pulses, one each of the adjustment pulses, corresponding to adjustment through the same rotational increment as that represented by a single count pulse from the master encoder 90. The second signal generated by encoder 144 is identical to the first signal with the exception that it is phase-displaced from the first signal, preferably by 90° of electrical phase. As seen in FIGS. *6a* and *6b*, both signals are supplied to the memory adjustor 126 of counter 112-P2 which, by determining which of the two generated signals leads the other by 90 electrical degrees, can determine the direction of the circumferential adjustment to the blanket cylinder 132 and the plate cylinder 134. Since the last count performed by accumulator 114 is still retained within memory 120, memory adjustor 126 can adjust the number within memory 120 in the proper direction and then reload the new number into memory 120. Thus, the updated measurement, upon setting display selector 152 accordingly, is shown on display 122-P2.

In addition to a means for circumferential adjustment through a full 360° while the press 10 is stopped, a means for adjustment of press 10 while running is also provided. This adjustment, known as a trim adjustment, is capable of circumferentially adjusting the cylinders of the print station 30 through only a maximum of ¼ inch of circumference in either direction. Nonetheless, so long as the circumferential setting has been set through use of stepper motor 146, this limited range will be sufficient to make necessary trim adjustments during running of the press 10.

An appropriate bearing housing 154 supports the end of impression cylinder 130 opposite the end to which gear 138*a* is attached. Housing 154 is mounted within the station side frame (not shown) such that limited lateral movement along the cylinder axis is permitted. A screw shaft 156 is rotatably mounted within a bracket or other suitable mounting block 158 fastened to the side frame. Shaft 156 cooperates with housing 154 so that by rotation of shaft 156, housing 154 and thus impression cylinder 130 may be moved axially in either direction.

A trim gear motor 160 is connected through reduction gears 162 to the screw shaft 156. When motor 160 is energized, screw shaft 156 is rotated, thereby causing the axial shift of the impression cylinder 130.

Because gear sets 136 and 138 are helical gears, the axial movement of impression cylinder 130 coupled with the interaction of the gears of gear set 136 causes either an increase or decrease in the rotational velocity of impression cylinder 130 with respect to drive train 12. Similarly, through gear set 138, the rotational velocity of the blanket cylinder 132 and the plate cylinder 134 is increased or decreased with respect to impression cylinder 130. Thus, the combined reactions provide an adjustment in the circumferential setting of print station 30 with respect to drive train 12.

A device 164 for measuring the circumferential adjustment provided by trim motor 160 is mounted so as to be stationary with respect to the side frame of print station 30. The device 164 includes a spring reel 166 from which is supplied a belt 168. Belt 168 is extended about a pulley attached to an encoder 170, preferably a shaft angle position encoder, and is attached to a rigid element 172 connected to the housing 154 supporting impression cylinder 130. Movement of the cylinder 130 in an axial direction causes the rigid element 172 to extend or retract belt 168 from the spring reel 166, with belt 168 acting as a linkage whereby encoder 170 is rotated.

It can be seen that the amount of trim adjustment available is necessarily limited, since the gears of gear sets 136 and 138 must remain engaged despite their lateral shifting. Accordingly, the operator must be provided an indication of the point along the available range of adjustment at which the apparatus is presently set. Otherwise, he may seek to make an adjustment only to find that perhaps there is no range remaining in the desired direction of adjustment. Thus, the display 122-P2 is further adapted to show trim adjustments expressed as a change, plus or minus, from the circumferential setting established by the gross adjustment means, rather than as an absolute setting wherein the trim and gross adjustments are combined.

Encoder 170 generates a pair of signals in a manner similar to encoder 144, but that are supplied to a second counter and logic circuit 112*a*-P2, identical in construction and operation to counter 112-P2. A first of the two signals includes a plurality of trim adjustment pulses, each adjustment pulse corresponding to axial movement of cylinder 130, which in turn corresponds to circumferential trim adjustment of print station 30. The second signal generated by encoder 170 includes a similar train of adjustment pulses, delayed from the first signal by 90 electrical degrees. In a manner identical to operation of the counters 112, count and reference pulses from master encoder 90 are supplied to counter 112*a*-P2, as seen in FIGS. *6a* and *6b*. A Hall effect switch 172 is mounted at one end of blanket cylinder 132, which when clutch 140 is engaged generates a pulse supplied as the marker pulse to counter 112*a*-P2. Since gross adjustments to station 30 are made with clutch 140 disengaged, switch 172 is not moved during such adjustments. Thus, it can be seen that the count produced within accumulator 114*a* represents the circumferential setting of the trim adjustment device 164 with respect to the drive train 12. Switch 172 is located so that when the marker and reference pulses supplied to counter 112a-P2 coincide, the trim adjustment device 164 is located at the midpoint of its adjustment range. Both signals generated by encoder 170 are supplied to memory adjustor 126a which compares the two signals in order to make a determination of the direction of rotation of encoder 170, and hence the direction of circumferential adjustment. Memory adjustor 126a then adds or subtracts, as appropriate, one-tenth the number of adjustment pulses received to or from the number stored in memory 120a and then reloads the adjusted number. The contents of memory 120a, as adjusted, are shown on the display 122-P2 upon proper setting of display selector 152.

It will be recognized that while trim motor 160 and related apparatus is intended primarily for use while press 10 is being run, it is equally usable for small, trim adjustment when press 10 is stopped.

Each of the gears used in driving cylinders 130, 132, and 134 from gearbox 16, i.e., the gears of gear sets 136, 138, and 142, possesses a certain amount of backlash or play as it meshes with adjacent gears. When web press 10 is being run, all of the gears are under load, and the backlash has no effect on the relative circumferential positions of cylinders 130, 132, and 134. When web press 10 is stopped, however, as is the case for making gross adjustments with clutch 140 disengaged, the backlash can account for as much as ⅛-inch variation in the relative circumferential positions of cylinders 130 and 134. Thus, trim adjustments made by trim motor 160 may not immediately adjust the setting of cylinder 134 the full amount desired, since part of the adjustment may be taken up by the backlash. Once web press 10 is restarted, however, the adjustment made to the circumferential setting of cylinder 130 is transferred in its entirety to cylinder 134 as the intervening gears are brought under load.

For this additional reason, however, a separate trim adjustment mechanism 164 is provided. Since trim adjustment pulses are generated independently of the interaction of gear sets 136, 138 and 142, the backlash has no effect upon the trim adjustment measurement system, and the trim adjustment shown by display 122-P2 is both accurate and instantaneous.

It will be further recognized that a number of different schemes for arranging the various displays 122 may be utilized with the press 10. For example, a master control board for the press 10 may include an array of displays 122, or may include a single display 122 upon which the contents of any of the memories 120 may be selectively shown. In the alternative, or in addition to arrangement on a control panel, the displays 122 may be mounted at or near the individual stations of the press 10, as suggested by FIG. 1. In any event, displays 122 should be mounted so as to be visible by the press operator when actuating the various adjustment mechanisms as described herein.

Further, it can be seen that the updated measurements produced by the present invention are well suited for use in a system wherein makeready and/or all subsequent adjustments to press 10 are made automatically. In such a case, the measurements are used to provide either a starting point for initial settings, or as a feedback to monitor the effectiveness of adjustments, by an appropriate microprocessor adapted to control the various adjustment devices described herein.

While the methods and forms of apparatus herein described constitute preferred embodiments of this invention, it is to be understood that the invention is not limited to these precise methods and forms of apparatus, and that changes may be made therein without departing from the scope of the invention.

What is claimed is:

1. An apparatus for measuring with respect to a first rotating element the circumferential setting of a second rotating element of a machine for operating on a moving web, said first and second elements being connected to a drive train for selective and simultaneous driving thereby at a common rotational speed, comprising:

means driven in synchronism with said first element for generating an electrical signal including one reference trigger pulse for each revolution of said first element with respect to a fixed point of said machine, and an electric signal including a train of count pulses, one each of said count pulses being generated in response to rotation of said first element through a predetermined increment;

means cooperating with said second rotating element for generating an electric signal including one marker trigger pulse for each revolution of said second element with respect to a fixed point of said machine;

means for receiving said reference pulses, said count pulses and said marker pulses, and for counting the number of said count pulses received subsequent to receipt of one of said trigger pulses and up to and simultaneous with receipt of the first succeeding one of the other of said trigger pulses;

said pulse receiving and counting means including a memory for retaining therein said number of said count pulses until receipt by said receiving and counting means of the second succeeding one of said other trigger pulses;

means for selectively adjusting the circumferential setting of said second rotating element with respect to said first rotating element; and means for generating an electric signal including adjustment pulses, a predetermined number of said adjustment pulses being generated in response to adjustment of said second element by said adjustment means through said increment of rotation corresponding to one of said count pulses;

said pulse receiving and counting means receiving said adjustment pulses, and modifying said number of said count pulses retained within said memory by the number of said adjustment pulses, divided by said predetermined number, received subsequent to receipt of said first other trigger pulse and up to and simultaneous with receipt of said second other trigger pulse;

said modifying of said number of said count pulses being made simultaneously with receipt of said adjustment pulses by said pulse receiving and counting means, whereby said number of said count pulses is representative of the current circumferential setting of said second element during times when driving of said first and second elements is stopped.

2. An apparatus for measuring with respect to a first rotating element the circumferential setting of a second rotating element of a machine for operating on a moving web, said first and second elements being connected to a drive train for selective and simultaneous driving thereby at a common rotational speed, comprising:

means driven in synchronism with said first element for generating an electrical signal including one reference trigger pulse for each revolution of said first element with respect to a fixed point of said machine, and an electric signal including a train of count pulses, one each of said count pulses being generated in response to rotation of said first element through a predetermined increment;

means cooperating with said second rotating element for generating an electric signal including one marker trigger pulse for each revolution of said second element with respect to a fixed point of said machine;

means for receiving said reference pulses, said count pulses and said marker pulses, and for counting the number of said count pulses received subsequent to receipt of one of said reference pulses and up to and simultaneous with receipt of the first suceeding one said marker pulses;

said pulse receiving and counting means including a memory for retaining therein said number of said count pulses until receipt by said receiving and counting means of the second succeeding one of said marker pulses;

means for selectively adjusting the circumferential setting of said second rotating element with respect to said first rotating element; and means for generating an electric signal including adjustment pulses, a predetermined number of said adjustment pulses being generated in response to adjustment of said second element by said adjustment means through said increment of rotation corresponding to one of said count pulses;

said pulse receiving and counting means receiving said adjustment pulses, and modifying said number of said count pulses retained within said memory by the number of said adjustment pulses, divided by said predetermined number, received subsequent to receipt of said first marker pulse and up to and simultaneous with receipt of said second marker pulse;

said modifying of said number of said count pulses being made simultaneously with receipt of said adjustment pulses by said pulse receiving and counting means, whereby said number of said count pulses is representative of the current circumferential setting of said second element during times when driving of said first and second elements is stopped.

3. The apparatus as defined in claim 2 further comprising means for selectively displaying the count retained within said memory.

4. The apparatus as defined in claim 2 wherein said means for generating said reference pulse and said count pulses includes an incremental encoder.

5. The apparatus as defined in claim 2 wherein said means for generating said marker pulse includes two parts, a Hall effect switch and a metallic sensor to which said switch is responsive, one of said two parts being mounted so as to be rotatable in synchronism with said second rotatable element and the other of said two parts being mounted so as to be stationary with respect to said second element, said parts cooperating once per revolution of said second element for generation of said marker pulse.

6. The apparatus as defined in claim 2 wherein said means for selective circumferential adjustment of said second element includes a differential device having a first input from said drive train, an output for driving said second element and connected thereto, and a second input, said adjustment means further including a motor connected to said second input for introducing rotational displacement between said drive train and said second input.

7. The apparatus as defined in claim 6 wherein said motor is a stepper motor, and wherein said means for generating said adjustment pulse generates said pulses in response to incremental actuation of said stepper motor.

8. The apparatus as defined in claim 2 wherein said means for generating said adjustment pulses includes means for generating a second electric signal for indicating the direction of adjustments made to the circumferential setting of said second rotating element, said pulse receiving and counting means being further adapted to receive said second signal and for modifying said retained number of count pulses in a numerical direction corresponding to the rotational direction indicated by said second signal.

9. The apparatus as defined in claim 2 wherein said means tor generating said adjustment pulses includes an incremental encoder, the shaft of said encoder being rotated in response to adjustment of the circumferential setting of said second element.

10. The apparatus as defined in claim 9 wherein said encoder shaft is coupled directly to said second element for generation of said adjustment pulses during circumferential adjustment of said second element when rotation of said element by said drive train is stopped.

11. The apparatus as defined in claim 9 wherein said means for selective circumferential adjustment of said second element includes a portion that moves linearly as said adjustment is made, said means for generating said adjustment pulse further including a linkage connecting said encoder shaft and said linearly moving portion for rotation of said shaft in response to movement of said portion.

12. In a machine for operating on a moving web having at least two rotating elements selectively and simultaneously driven by a drive train at a common rotational speed, in which an apparatus for measuring with respect to said first rotating element the circumferential setting of said second rotating element includes:

means driven in synchronism with said first element for generating an electric signal, including one reference trigger pulse for each revolution of said first element with respect to a fixed point of said machine, and an electric signal including a train of count pulses, one each of said count pulses being generated in response to rotation of said first element through a predetermined increment;

means cooperating with said second rotating element for generating an electric signal including one marker trigger pulse for each revolution of said second element with respect to a fixed point of said machine;

means for receiving said reference pulses, said count pulses and said marker pulses, and for counting the number of said count pulses received subsequent to receipt of one of said reference pulses and up to and simultaneous with receipt of the first succeeding one of said marker pulses;

means for selectively adjusting the circumferential setting of said second rotating element with respect to said first rotating element; and means for displaying the count performed by said pulse receiving and counting means, the improvement comprising:

means for generating an electric signal including adjustment pulses, a predetermined number of said adjustment pulses being generated in response to adjustment of said second element by said adjustment means through said increment of rotation corresponding to one of said count pulses;

said pulse receiving and counting means receiving said adjustment pulses, and modifying said number of said count pulses retained within said memory by the number of said adjustment pulses, divided by said predetermined number, received subsequent to receipt of said first marker pulse and up to and simultaneous with receipt of said second marker pulse;

said modifying of said number of said count pulses being made simultaneously with receipt of said adjustment pulses by said pulse receiving and counting means, whereby said number of said count pulses is representative of the current circumferential setting of said second element during times when driving of said first and second elements is stopped.

13. A method for measuring with respect to a first rotating element the circumferential setting of a second element of a machine for operating on a moving web, said first and second elements being connected to a drive train for selective and simultaneous driving thereby at a common rotational speed, said machine including means for selectively adjusting the circumferential setting of said second element with respect to said first element, said method comprising the steps of:

generating an electric signal including a train of count pulses, one each of said count pulses being generated in response to rotation of said first element through a predetermined increment;

generating an electric signal including one reference trigger pulse for each revolution of said first element with respect to a fixed point of said machine;

generating an electric signal including one marker trigger pulse for each revolution of said second element with respect to a fixed point of said machine;

generating an electric signal which, in the event said adjustment means is actuated, includes at least one adjustment pulse, a predetermined number of said adjustment pulses being generated in response to adjustment of said second element through each said increment of rotation corresponding to one of said count pulses;

counting said count pulses generated subsequent to generation of one of said reference pulses and up to and simultaneous with generation of the first succeeding one of said marker pulses;

retaining within a memory the number of said count pulses until generation of the second succeeding one of said marker pulses; and modifying said number retained within said memory by the number of said adjustment pulses, divided by said predetermined number, generated subsequent to generation of said first marker pulse and up to and simultaneous with generation of said second marker pulse;

said number of said clock pulses being modified simultaneously with generation of said adjustment pulses whereby said number of said count pulses is representative of the current circumferential setting of said second element during times when driving of said first and second elements is stopped.

14. The method as defined in claim 13 further comprising the step of displaying said number retained within said memory.

* * * * *